United States Patent
Dunham et al.

(10) Patent No.: US 7,562,175 B2
(45) Date of Patent: *Jul. 14, 2009

(54) INTERNET SCSI COMMUNICATION VIA UNDI SERVICES

(75) Inventors: Scott Neil Dunham, Raleigh, NC (US); Eric Richard Kern, Chapel Hill, NC (US); Sumeet Kochar, Apex, NC (US); John Matthew Landry, Wake Forest, NC (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/828,112

(22) Filed: Jul. 25, 2007

(65) Prior Publication Data

US 2007/0266195 A1    Nov. 15, 2007

Related U.S. Application Data

(63) Continuation of application No. 11/127,397, filed on May 12, 2005, now Pat. No. 7,430,629.

(51) Int. Cl.
*G06F 13/14* (2006.01)
*G06F 11/00* (2006.01)
*G06F 13/00* (2006.01)
*G06F 15/177* (2006.01)

(52) U.S. Cl. .............................. 710/305; 713/2; 714/45; 719/326

(58) Field of Classification Search ................. 710/305; 714/45; 719/326; 713/2
See application file for complete search history.

(56) References Cited

U.S. PATENT DOCUMENTS 5,577,210 A    11/1996    Abdous et al.

(Continued)

FOREIGN PATENT DOCUMENTS

WO    02069159    9/2002

OTHER PUBLICATIONS

Speight et al., Realizing the Performance Potential of the Virtual Interface Architecture, International Conference on Supercomputing: Proceedings of the 13th International Conference on Supercomputing, 1999, pp. 184-192.

(Continued)

*Primary Examiner*—Khanh Dang
*Assistant Examiner*—Christopher A Daley
(74) *Attorney, Agent, or Firm*—Cynthia G. Seal; Law Office of Jim Boice

(57) ABSTRACT

A method and system for emulating a hardware Internet Small Computer System Interface (iSCSI) Host Bus Adapter (HBA) without risking an interruption of communication between a computer and a remote secondary storage device is presented. During normal operations, a (hardware emulating) software HBA drives a Network Interface Card (NIC) to afford communication between the computer and the remote secondary storage. If an operating system (OS) anomaly occurs in the computer, the NIC is normally disconnected by the OS. To maintain communication between the computer and the secondary storage device if such an event occurs, a failover network device is called up by the computer's System Management Memory (SMM) Basic Input Output System (BIOS), which allows uninterrupted communication to continue between the computer and remote secondary storage device.

20 Claims, 10 Drawing Sheets

U.S. PATENT DOCUMENTS

| | | | |
|---|---|---|---|
| 5,819,115 A | 10/1998 | Hoese et al. | |
| 6,195,680 B1 | 2/2001 | Goldszmidt et al. | |
| 6,393,560 B1* | 5/2002 | Merrill et al. | 713/2 |
| 6,470,397 B1* | 10/2002 | Shah et al. | 709/250 |
| 6,609,151 B1* | 8/2003 | Khanna et al. | 709/222 |
| 6,792,610 B2* | 9/2004 | Cheon | 719/327 |
| 6,807,630 B2* | 10/2004 | Lay et al. | 713/2 |
| 6,857,069 B1* | 2/2005 | Rissmeyer et al. | 713/2 |
| 6,862,688 B2* | 3/2005 | Ochiai | 714/2 |
| 6,871,296 B2 | 3/2005 | Kashyap | |
| 7,028,308 B2* | 4/2006 | Kim | 719/321 |
| 7,234,053 B1* | 6/2007 | Mahmoud | 713/2 |
| 7,249,201 B1* | 7/2007 | Mahmoud | 710/8 |
| 7,313,685 B2* | 12/2007 | Broyles et al. | 713/2 |
| 7,373,433 B2* | 5/2008 | Vageline | 710/14 |
| 2002/0053047 A1* | 5/2002 | Gold | 714/45 |
| 2002/0144242 A1 | 10/2002 | Owhadi | |
| 2003/0093602 A1 | 5/2003 | Chou et al. | |
| 2003/0097607 A1* | 5/2003 | Bessire | 714/5 |
| 2003/0130833 A1 | 7/2003 | Brownell et al. | |
| 2003/0145235 A1* | 7/2003 | Choo | 713/201 |
| 2003/0200273 A1 | 10/2003 | Khanna et al. | |
| 2003/0236861 A1 | 12/2003 | Johnson et al. | |
| 2004/0044744 A1 | 3/2004 | Grosner et al. | |
| 2004/0049670 A1 | 3/2004 | Miyamoto et al. | |
| 2004/0062245 A1 | 4/2004 | Sharp et al. | |
| 2004/0064590 A1 | 4/2004 | Starr et al. | |
| 2004/0093411 A1* | 5/2004 | Elzur et al. | 709/224 |
| 2004/0111498 A1 | 6/2004 | Andreas | |
| 2004/0153697 A1 | 8/2004 | Chang et al. | |
| 2005/0125691 A1 | 6/2005 | Garg et al. | |
| 2005/0138346 A1* | 6/2005 | Cauthron | 713/2 |
| 2005/0215128 A1* | 9/2005 | Levy et al. | 439/894 |
| 2005/0228903 A1 | 10/2005 | Lerner et al. | |
| 2006/0018263 A1 | 1/2006 | McGee et al. | |
| 2006/0070032 A1* | 3/2006 | Bramley et al. | 717/124 |
| 2006/0248535 A1 | 11/2006 | Grover | |
| 2007/0033260 A1* | 2/2007 | Grouzdev et al. | 709/213 |

OTHER PUBLICATIONS

Socket Access on Native NETBIOS Protocol, IBM Technical Disclosure Bulletin, Oct. 1993, vol. 36, No. 10, pp. 217-218.

Supporting Advanced Peer-to-Peer Networking Session Services Extensions Protocols Over Non-Systems Network Architecture Transport Networks, IBM Technical Disclosure Bulletin, Nov. 1996, vol. 39, No. 11, pp. 153-159.

Office Action dated May 1, 2007, U.S. Appl. No. 11/127,397.

Office Action dated Dec. 4, 2006, U.S. Appl. No. 11/127,397.

* cited by examiner

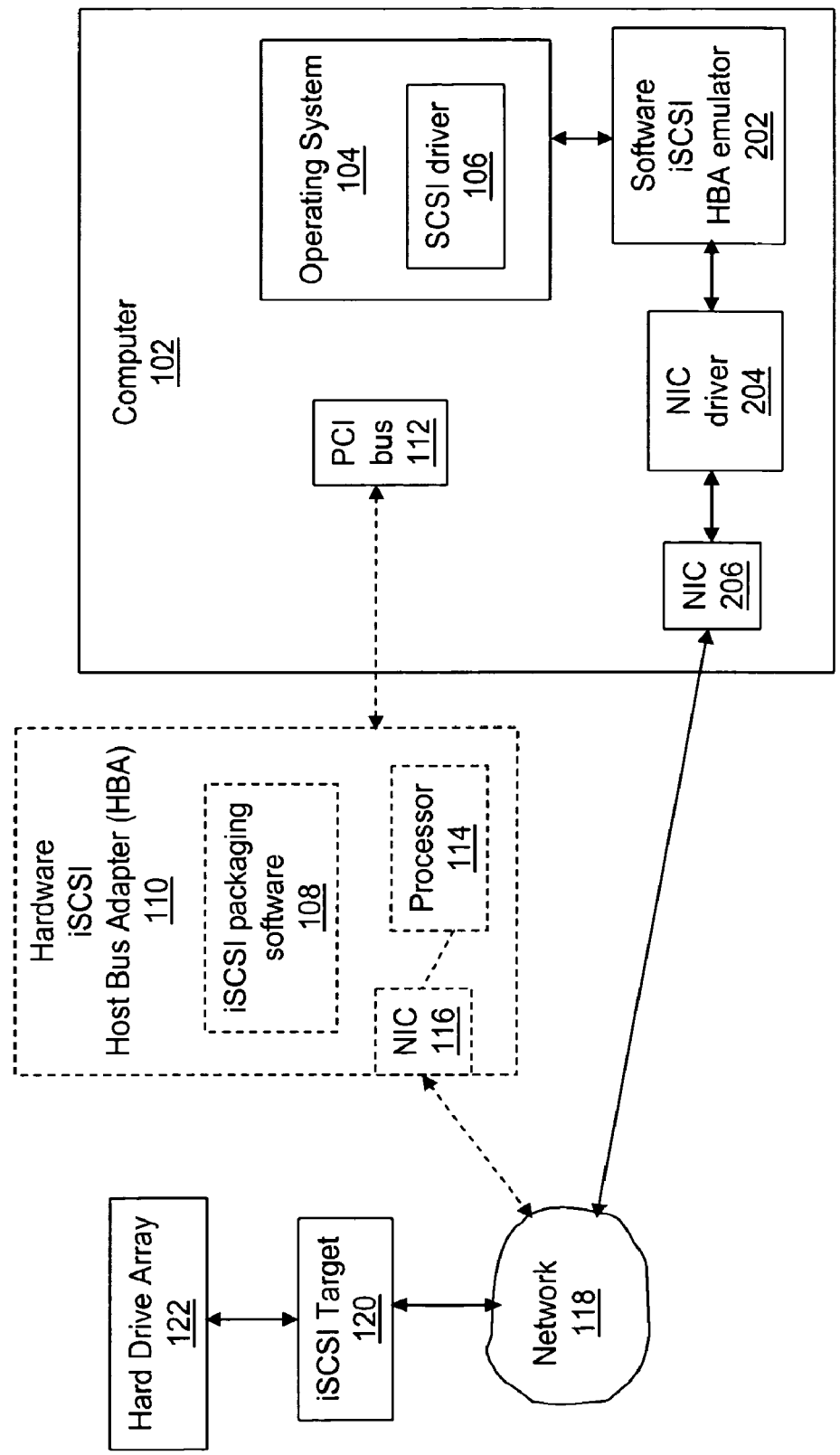

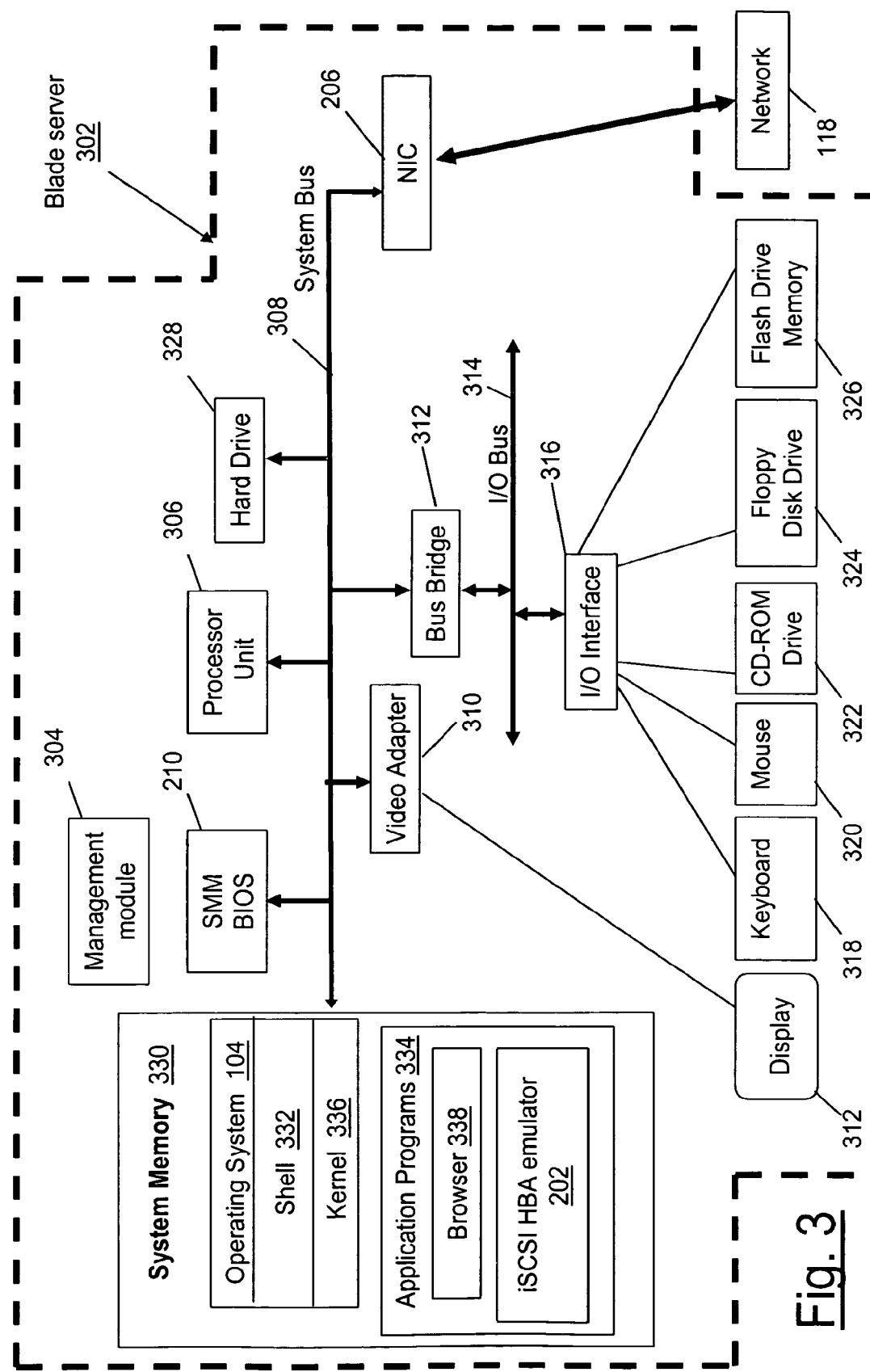

INTERNET SCSI COMMUNICATION VIA UNDI SERVICES

The present application is a continuation of U.S. patent application Ser. No. 11/127,397 filed on May 12, 2005, now U.S. Pat. No. 7,430,629 and entitled, "Internet SCSI Communication via UNDI Services," which is incorporated herein by reference.

BACKGROUND OF THE INVENTION

1. Technical Field

The present invention relates in general to the field of computers, and in particular to network based computers. Still more particularly, the present invention relates to a method and system for maintaining software-based Internet Small Computer System Interface (iSCSI) communication between a computer and a secondary storage if an operating system (OS) anomaly in the computer disrupts the operation of an iSCSI network interface driver.

2. Description of the Related Art

Two ongoing improvements to modern computers are speed and resource sharing. Computers such as blade server computers, which have multiple server blades in a single server chassis, have processors and input/output (I/O) busses that continue to increase in speed and bandwidth capacity. The same is true for secondary memory devices such as hard drive arrays. However, devices that allow computers to communicate remotely with secondary memory devices often cause a data bottleneck.

For example, consider the prior art network topology depicted in FIG. 1. A computer 102 is shown having an operating system (OS) 104, which includes a Small Computer System Interface (SCSI) driver 106. SCSI driver 106 allows data to be put on a SCSI bus (not shown) in computer 102, to which can be connected secondary storage devices such as local hard drives (also not shown).

In an effort to promote scalability and resource sharing, computer 102 uses Internet SCSI (iSCSI). iSCSI is an Internet Protocol (IP) based storage networking standard that has been developed by the Internet Engineering Task Force (IETF), whose current iSCSI standard is herein incorporated by reference in its entirety. Data destined to a storage device on a SCSI bus is wrapped in an IP packet, and sent over the Internet to a remote storage device, which unwraps the IP packet to recover the SCSI commands and data. This function of wrapping and unwrapping SCSI commands and data for computer 102 is performed by iSCSI packaging software 108 found in a hardware iSCSI Host Bus Adapter (HBA) 110, which typically is coupled to a Peripheral Component Interface (PCI) bus 112 in computer 102.

Hardware iSCSI HBA 110's main components include a processor 114 and a Network Interface Card (NIC) 116. Processor 114 utilizes instructions from iSCSI packaging software 108 to wrap/unwrap the IP packets, and NIC 116 affords communication between computer 102 and a network 118, which may be an Ethernet, Internet, or any other network capable of supporting the IP protocol.

The IP/iSCSI packets are communicated with an iSCSI target 120, which is the server component of a Storage Area Network (SAN), which includes a secondary memory represented as a Hard Drive Array (HDA) 122. Thus, data to be written to and read from HDA 122 by computer 102 is able to be communicated via network 118, which allows HDA 122 to be at any remote location away from computer 102.

As noted above, hardware iSCSI KBA 110 is a main bottleneck to data traveling between HDA 122 and computer 102. There are several reasons why this is the case, including speed constraints inherent in hardware iSCSI HBA 110's processor 114 and NIC 116. Thus, there is a need to develop a method and system that avoids this hardware bottleneck.

SUMMARY OF THE INVENTION

In response to the shortcomings of the prior art system described, the present invention is thus directed to a method and system for emulating a hardware Internet Small Computer System Interface (iSCSI) Host Bus Adapter (HBA) without risking an interruption of communication between a computer and a remote secondary storage device. During normal operations, a (hardware emulating) software iSCSI HBA drives a Network Interface Card (NIC) to afford communication between the computer and the remote secondary storage. If an operating system (OS) anomaly occurs in the computer, the NIC is normally disconnected by the OS. To maintain communication between the computer and the secondary storage device if such an event occurs, a failover network device is called up by the computer's System Management Memory (SMM) Basic Input Output System (BIOS), which allows uninterrupted communication to continue between the computer and remote secondary storage device.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2a illustrates a software Host Bus Adapter emulator in the local computer shown in FIG. 1;

FIG. 3 depicts an exemplary local computer, shown as a blade server, in which the present invention can be implemented;

DETAILED DESCRIPTION OF THE PREFERRED EMBODIMENT

Figure 1:
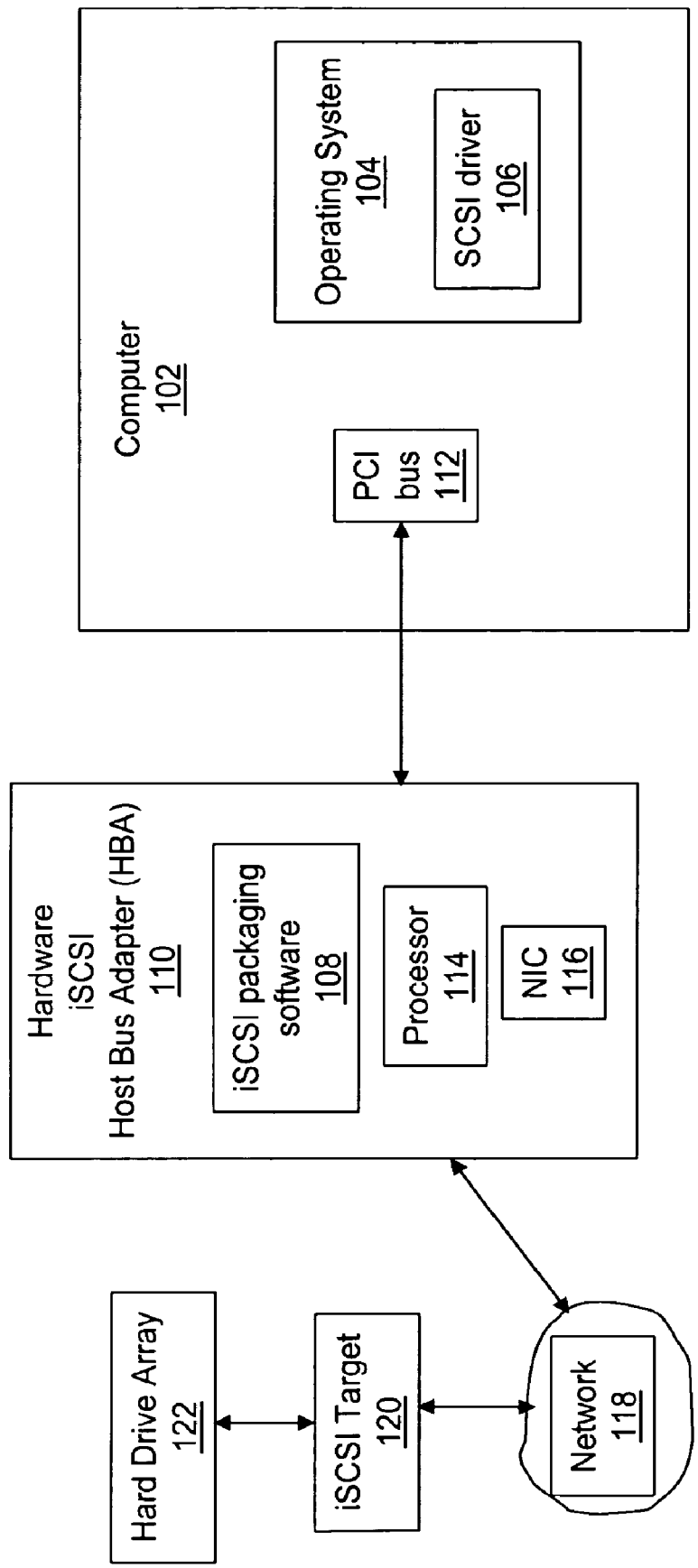
FIG. 1 depicts a prior art network topology using a remote hard drive array for use by a local computer.

With reference now to FIG. 2a, there is depicted a network topology using a software Internet Small Computer System Interface (iSCSI) Host Bus Adapter (HBA) emulator 202 (HBA emulator 202). HBA emulator 202 uses software to emulate the hardware iSCSI HBA 110 described above. HBA emulator 202 includes the ability to package packets of SCSI data, as described above using iSCSI packaging software 108. The iSCSI data packets (wrapped with an Internet Protocol—IP header) are sent to a Network Interface Card (NIC) driver 204, which sends the iSCSI data packets to network 118 via a NIC 206 in the computer 102. HBA emulator 202 is used instead of hardware iSCSI HBA 110.

Figure 2B:
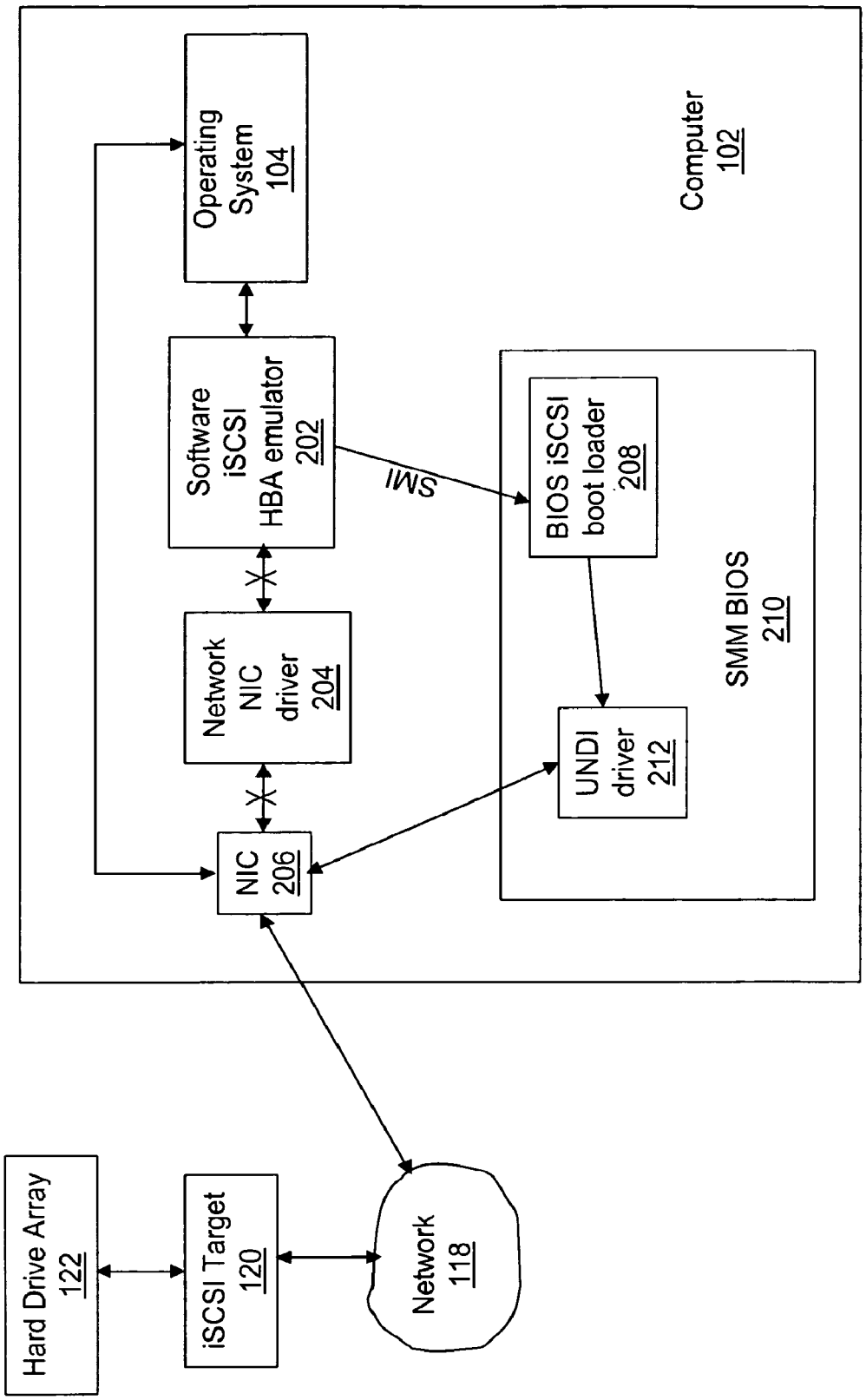
FIG. 2b, depicts a failover system used if an anomaly occurs in an operating system in the local computer, which anomaly causes the software Host Bus Adapter emulator to break communication between the remote hard drive array and the local computer.

If computer 102 is using Window® as its operating system 104, NIC driver 204 will be shut down at the beginning of an OS anomaly, such as the OS shutting down, the OS receiving an upgrade (or patch), or the OS crashing. Thus, HBA emulator 202 is unable to communicate with NIC 206, leaving the communication pathway between computer 102 and hard drive array 122 broken. This situation not only interrupts communication between computer 102 and hard drive array 122, but also may result in the operating system 104 not "knowing" that data sent to HBA emulator 202 is not getting passed on to NIC 206. To address this problem, as shown in FIG. 2b, HBA emulator 202, in response to detecting an OS anomaly, sends a System Management Interrupt (SMI) signal to a Basic Input/Output System (BIOS) iSCSI boot loader 208 found in computer 102's System Management Mode (SMM) BIOS 210. BIOS iSCSI boot loader 208 calls up a Universal Network Device Interface (UNDI) driver 212, which creates a failover link between network 118 and operating system 104 (more specifically, whatever relevant portions of operating system 104 that are not affected by the OS anomaly) via NIC 206. The UNDI driver 212 then re-enables the NIC 206 to permit communication between computer 102 and hard drive array 122.

Figure 2C:
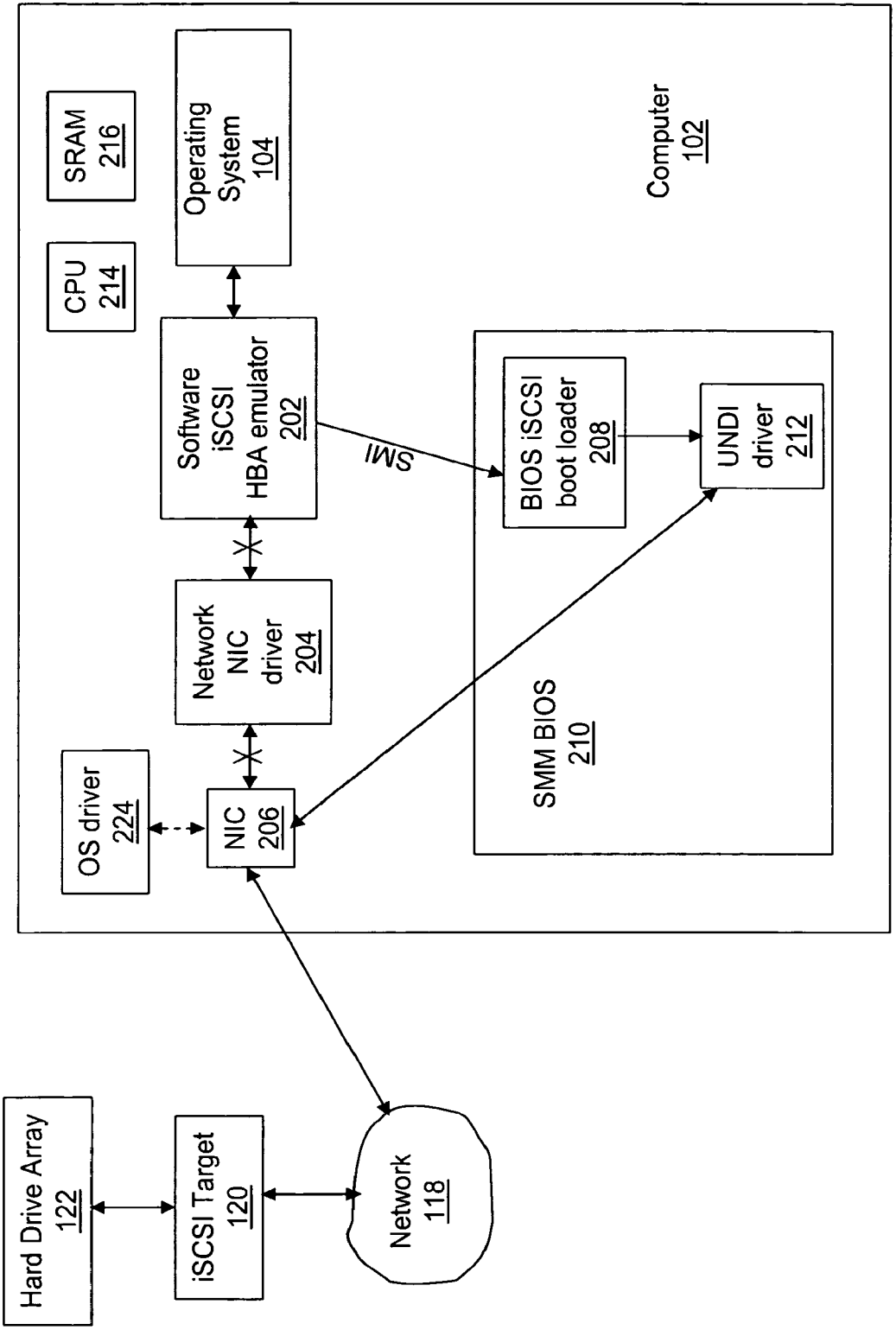
FIG. 2c illustrates additional detail of the operation of the failover system shown in FIG. 2b.

Further detail of the steps described in FIG. 2b are shown in FIG. 2c. First, note that SMM is a reduced power consumption state provided by certain processors, including some manufactured by Intel®. When a CPU 214 enters SMM, CPU 214 saves its current state in computer 102's Static Random Access Memory (SRAM) 216 in an area called System Management RAM (SMRAM). CPU 214 then runs, from SMRAM, an SMM handler program, which calls the BIOS iSCSI boot loader 208 as described above.

UNDI driver 212 refers to a universal driver that is compliant with the UNDI standard, which provides a hardware-independent and OS-independent mechanism for communicating with a network. UNDI provides a mechanism for Pre-Boot Execution Environment (PXE) base code to use a NIC for network access without controlling the NIC hardware directly. While UNDI can be implemented in either hardware or software, in the preferred embodiment of the present invention it is implemented in software in the SMM BIOS 210.

Thus, software iSCSI HBA emulator 202, which runs under operating system 104, is bypassed, and communication with iSCSI target 120 is via BIOS iSCSI boot loader 208, which contains resident code for booting iSCSI target 120 as if it were a local drive. OS driver 224, which represents an active portion of operating system 104 that is not affected by the OS anomaly, thus continues to communicate with hard drive array 122 via the now (by virtue of the code from the BIOS iSCSI boot loader 208) loaded iSCSI target 120. Note that while in a preferred embodiment hard drive array 122 is an array of hard drives (as the name suggests), alternatively hard drive array 122 may be any secondary memory, which is defined as any non-volatile memory that cannot be directly processed by a CPU, and includes but is not limited to hard drive arrays, tape drive(s), optical disk drives, and other similar mass storage devices.

With reference now to FIG. 3, there is depicted a block diagram showing additional detail of computer 102, which is shown for exemplary purposes as a blade server 302 found in a blade server computer (not shown, but understood to be composed of a chassis holding multiple blade servers, each of which have one or more processors). Blade server 302 includes a management module 304, which permits coordination of operations among other blade servers 302 within the blade server computer.

Blade server 302 also includes a processor unit 306, which may be one or more processors operating in harmony, coupled to a system bus 308. Also coupled to system bus 308 is a video adapter 310, which drives/supports a display 312.

System bus 308 is coupled via a bus bridge 312 to an Input/Output (I/O) bus 314. Coupled to I/O bus 314 is an I/O interface 316, which affords communication with various I/O devices, including a keyboard 318, a mouse 320, a Compact Disk—Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Blade server 302 is able to communicate with network 118 via a network interface such as Network Interface Card (NIC) 206 (also shown in FIG. 2b), which is coupled to system bus 308. Network 118 may be a Local Area Network (LAN), or preferably is a Wide Area Network (WAN) such as the Internet.

Also coupled to system bus 308 is a SMM BIOS 210, discussed above in reference to FIG. 2b, which shows BIOS iSCSI boot loader 208 and UNDI driver 212. In a preferred embodiment, hard drive 328, along with firmware such as found in a System Management Module Basic Input/Output System (SMM BIOS) 210 chip, populates a system memory 330, which is also coupled to system bus 308. Data that populates system memory 330 includes blade server 102's operating system 104, which includes a command interpreter program known as a shell 332, which is incorporated in a higher level operating system layer and utilized for providing transparent user access to resources such as application programs 334.

As is well known in the art, a command interpreter or "shell" is generally a program that provides an interpreter and interfaces between the user and the operating system. More specifically, a shell program executes commands that are entered into a command line user interface or from a file. The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g., a kernel 336) for processing.

Exemplary application programs 334 used in the present invention are a web browser 338 and iSCSI HBA emulator 202 (discussed above). Web browser 338 includes program modules and instructions enabling a World Wide Web (WWW) client (i.e., blade server 302) to send and receive network messages to the Internet using HyperText Transfer Protocol (HTTP) messaging.

Note that the hardware elements depicted in blade server 302 are not intended to be exhaustive, but rather are representative to highlight essential components required by the present invention. For instance, blade server 302 may include alternate memory storage devices such as magnetic cassettes, Digital Versatile Disks (DVDs), Bernoulli cartridges, and the like. These and other variations are intended to be within the spirit and scope of the present invention.

Figure 4:
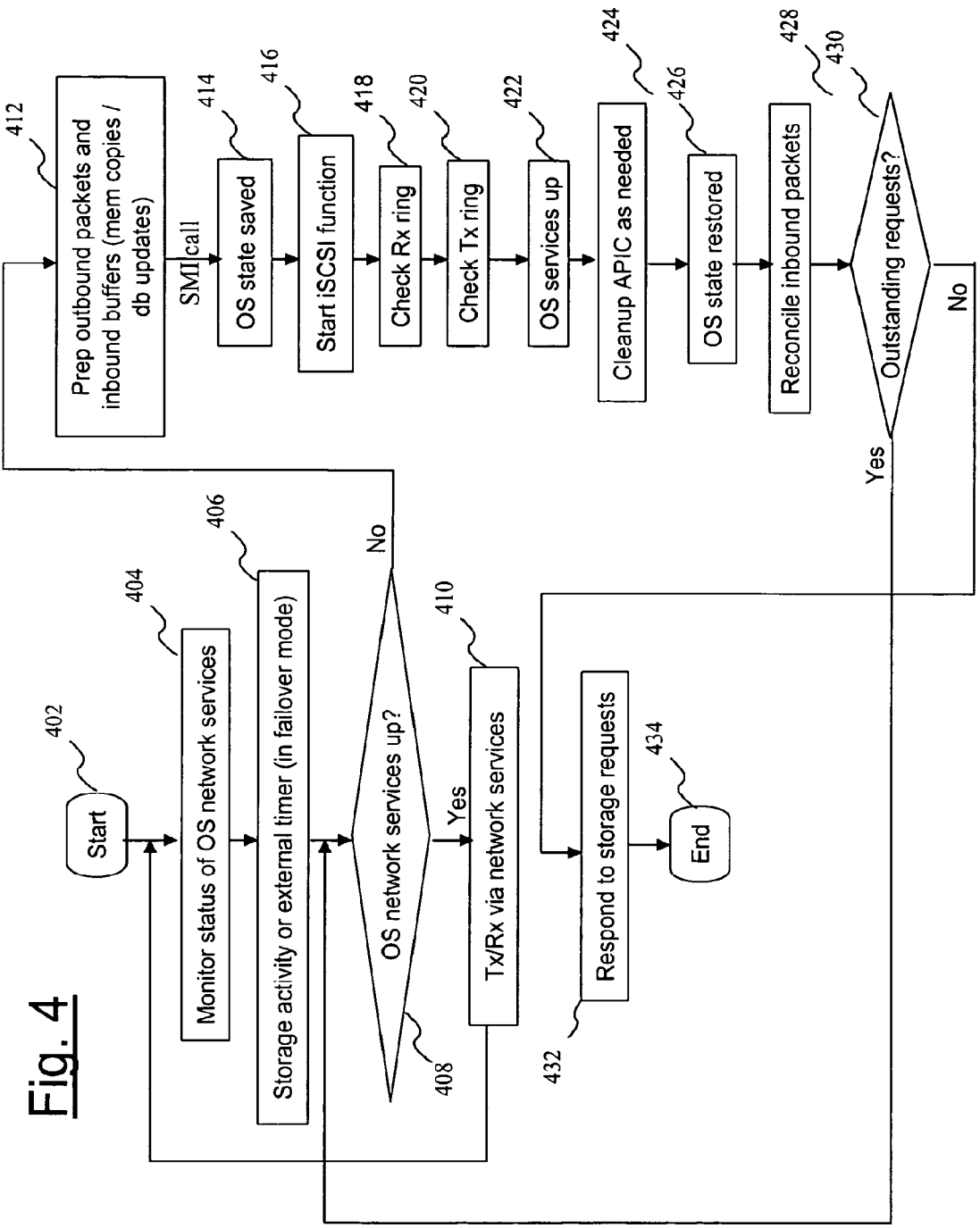
FIG. 4 is a flow-chart of an overview of steps taken in the failover system of the present invention.

With reference now to FIG. 4, a flow-chart showing exemplary steps taken by the present invention is provided. After initiator block 402, the status of operating system (OS) network services is monitored (block 404). This monitoring includes checking the OS's queue status (including a representation of whether threads in programs are being properly handled) and whether there are any Plug-and-Play (PnP) callbacks (indicating a possible need for a device driver to be loaded and/or downloaded from a remote location). In addition (block 406), any storage activity and/or expiration of a pre-determined timer may likewise indicate an anomaly or event related to the OS has occurred which will cause the OS to initiate a shut-down or at least a quiescent state, which will result in communication using NIC driver 204 to end, as discussed above.

A query is made(query block 408), in response to detecting the OS anomaly, asking if OS network services are up. That is, the query determines if the OS is initiating a shut-down or quiescent mode. If the OS network services are still up, then all transmissions/receipts of data packets (block 410), including those to hard driver array 122 described above, are handled normally using NIC driver 204, and the process returns to block 404 to continue monitoring the status of the OS network services.

If the network OS services are not up (an anomaly is occurring), the outbound packets and inbound buffers are prepared (block 412). Pending packets are preferably copied to a SMM visible region, and any available buffers are updated. Memories are copied and databases are updated to prepare the system for a System Management Interrupt (SMI) call that drives the current OS state (contents of registers containing current interim state values) to be saved (block 414).

Next, the iSCSI function is started (block 416) by entering into SMM mode as described above. This includes initiating Transmission Control Protocol (TCP) functionality as well as checking the "receiving" ring (block 418) for incoming data from the hard drive array to the computer, and checking the "transmitting" ring (block 420) for outgoing data from the computer to the hard drive array.

After using the failover iSCSI failover system described above in FIG. 2c, a determination is made (block 422) that the original OS services are again available (the anomaly is over). The Advanced Programmable Interrupt Controller (APIC), which handles interrupts from and for multiple CPUs, is cleaned up (block 424) as needed (due to having some interrupt pending due to UNDI, which must be cleared so that the original OS services to not respond to that interrupt). A call is made to restore the original OS states (block 426), inbound packets are reconciled (block 428), and a determination is made to see if there are other data requests between the computer and the hard drive array (query block 430). If so, then the process returns to block 404. Otherwise, the original OS responds normally to data storage requests from the computer to the hard drive array (block 432), and the process ends (terminator block 434).

Figure 5:
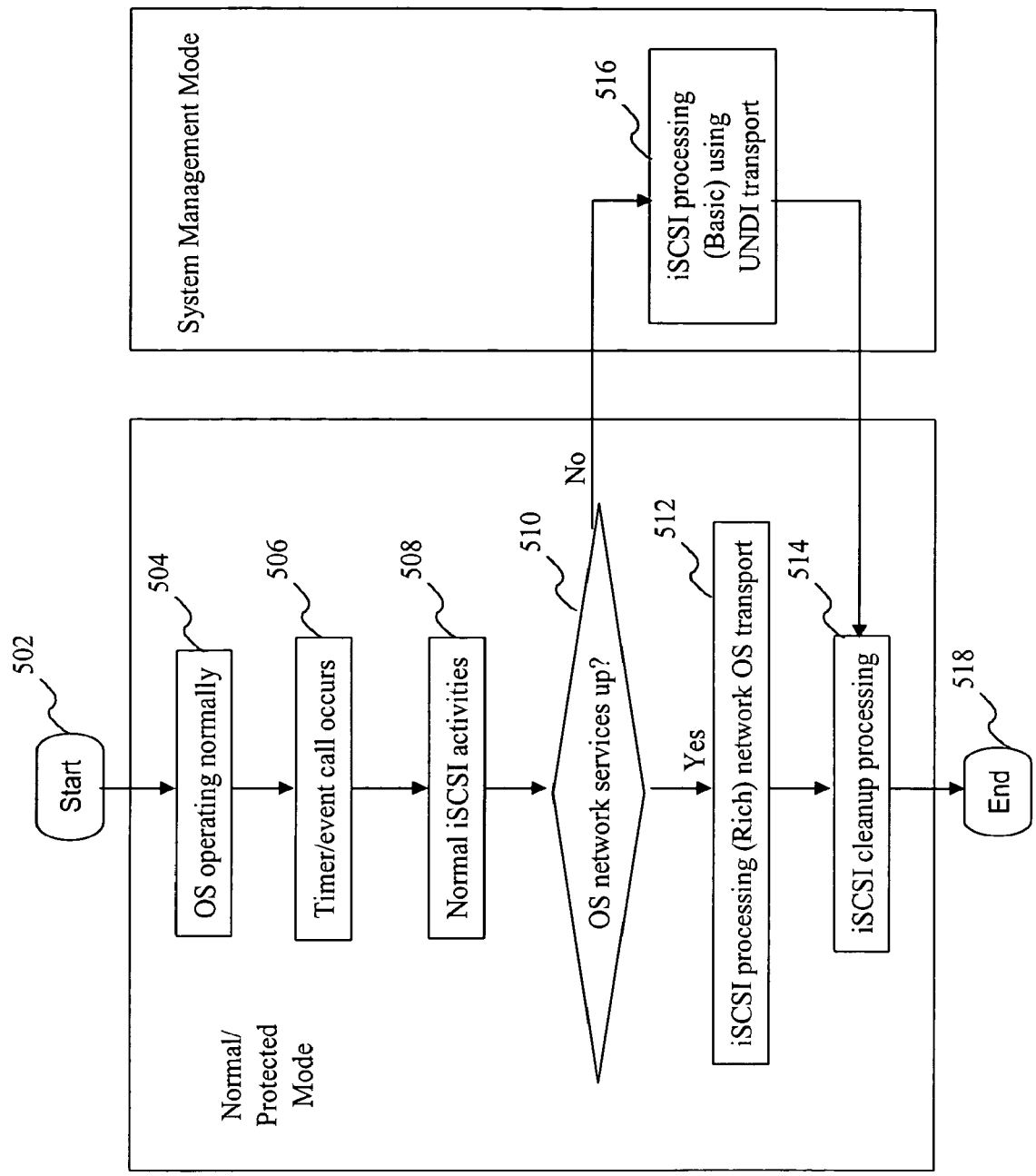
FIG. 5 is a flow-chart of steps taken in the present invention as described from the perspective of an overall approach of an Internet Small Computer System Interface (iSCSI) Boot/Page Media (BPM) failover.

Referring now to FIG. 5, a flow-chart is presented giving an approach overview of the presently described iSCSI Boot/Page Media (BPM) failover approach. After initiator block 502, a determination is made that the OS is operating normally (block 504), as indicated by the Normal/Protected Mode notation. Standard Windows®/Linux® transport is occurring for packets going between the computer and the remote hard drive array. A timer expires or an anomaly event occurs (block 506), and at least initially the iSCSI activities (block 508), continue to function normally. However, if a determination is made that the OS network services are not up (query block 510), resulting in the loss of the normal use of the NIC as described above, then the process enters the System Management Mode, interrupts are disabled, Information Storage and Retrieval (ISR) registers are checked for events such as any inbound packets to process, transmission packet rings are set up to handle the launching of outbound packets, and iSCSI process (Basic) is initiated using the UNDI transport described in FIG. 2c (block 516). If the OS services are up, then the iSCSI processing (Rich) network OS transport services are used in a normal fashion (block 512). In either event, iSCSI cleanup processing (block 514) occurs, including completion of transmitting and receiving any packets in flight between the computer and the hard drive array, and the process ends (terminator block 518).

With regards to the SMM (System Management Mode) used in the present invention, consider the following overview. SMM is a special execution mode that preferably is able to handle a big address mode capable of accessing up to 4 GB of memory space (with a default of 1 MB using 16 bit op/16 bit segment). Single threaded execution in SMM executes until a return call returns the processor to its previous state. All protected mode data structures are left intact during interrupts by saving processor state to state space upon a system management call. Any processor in a blade or a blade server can enter system SMM upon an SMI interrupt, so these entries must be coordinated among blades in a multi-blade server chassis. SMM is valuable in the present invention since it is an independent and isolated environment from the OS, and thus has no dependencies on OS services. Furthermore, the real mode address found in SMM is conducive to UNDI usage due to simple addressing features.

Figure 6:
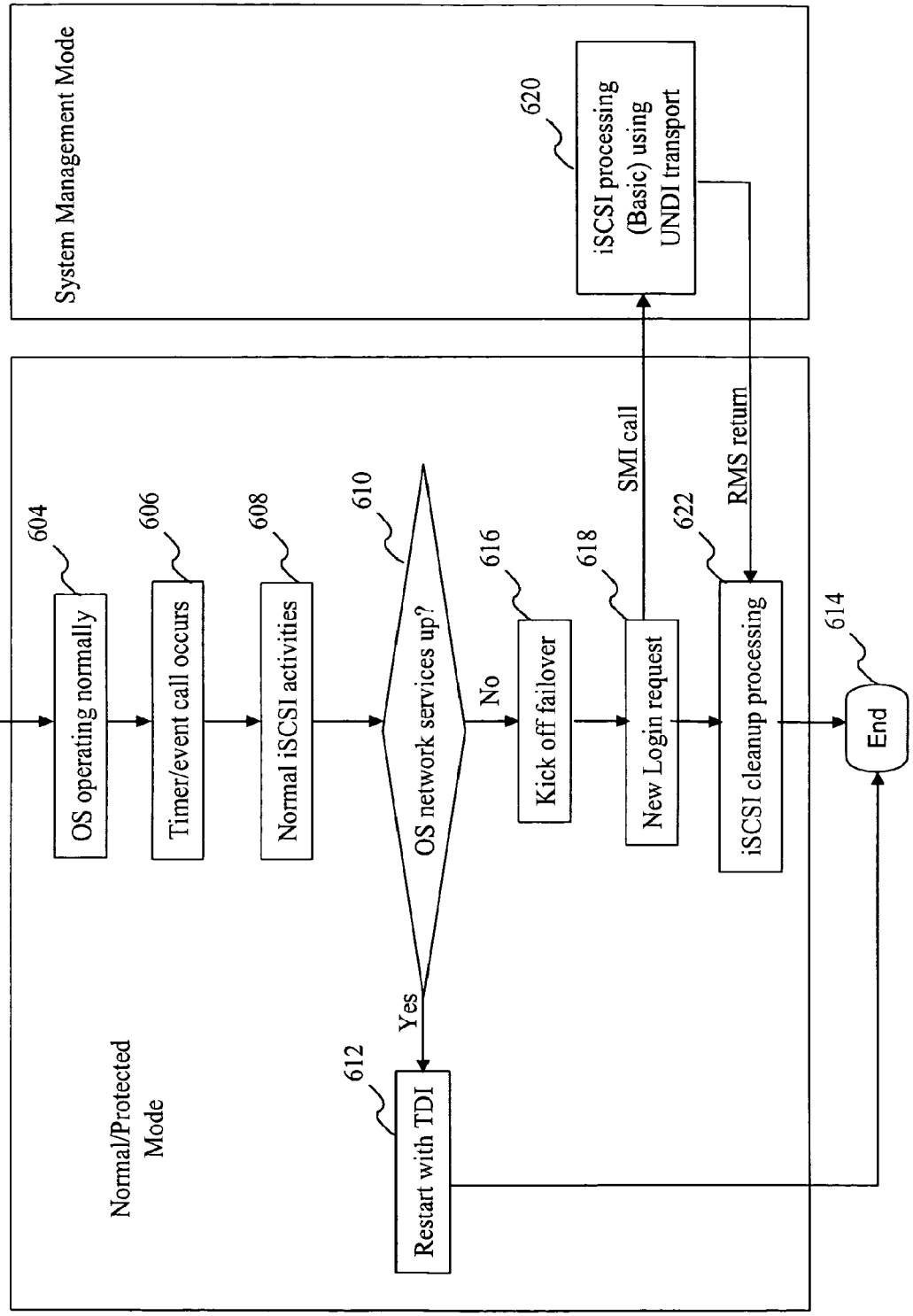
FIG. 6 is a flow-chart showing an overview of a Login process for the iSCSI/BPM failover process.

With reference now to FIG. 6, an overview of the Login process of the iSCSI BPM failover process is shown, in which the transition from OS network services to iSCSI/UNDI services is initiated. After initiator block 602, steps 604 through 608 are similar to steps 504 through 508 described in FIG. 5. If not OS network services are up (query block 610), then a restart of operations using a Transport Driver Interface (TDI), which is a software interface between the protocols and the Application Programming Interface (API) layers or the Windows® NT network model, is performed (block 612), and the process ends (terminator block 614). If the OS network services are not up, such as the iSCSI driver detecting that TDI is down, the kick off failover (block 616) initiates, including preparing to re-login using the UNDI transport, starting a timer to ensure call returns are proper, etc. Thus, when a new login request for data being transported between the computer and the hard drive array occurs, an SMI call to the iSCSI processing using UNDI transport occurs (block 620) in the SMM. THE UNDI is polled for a response, including jumping into SMM, querying status/receive/transmit quests for iSCSI, etc. A session negotiation is launched via the SMM UNDI, which returns from the SMM for OS execution. When UNDI determines that that OS anomaly is over, then an RMS return call returns the operation to the normal (now protected OS mode), and iSCSI cleanup is performed (block 622), ending the process (terminator block 614).

Figure 7:
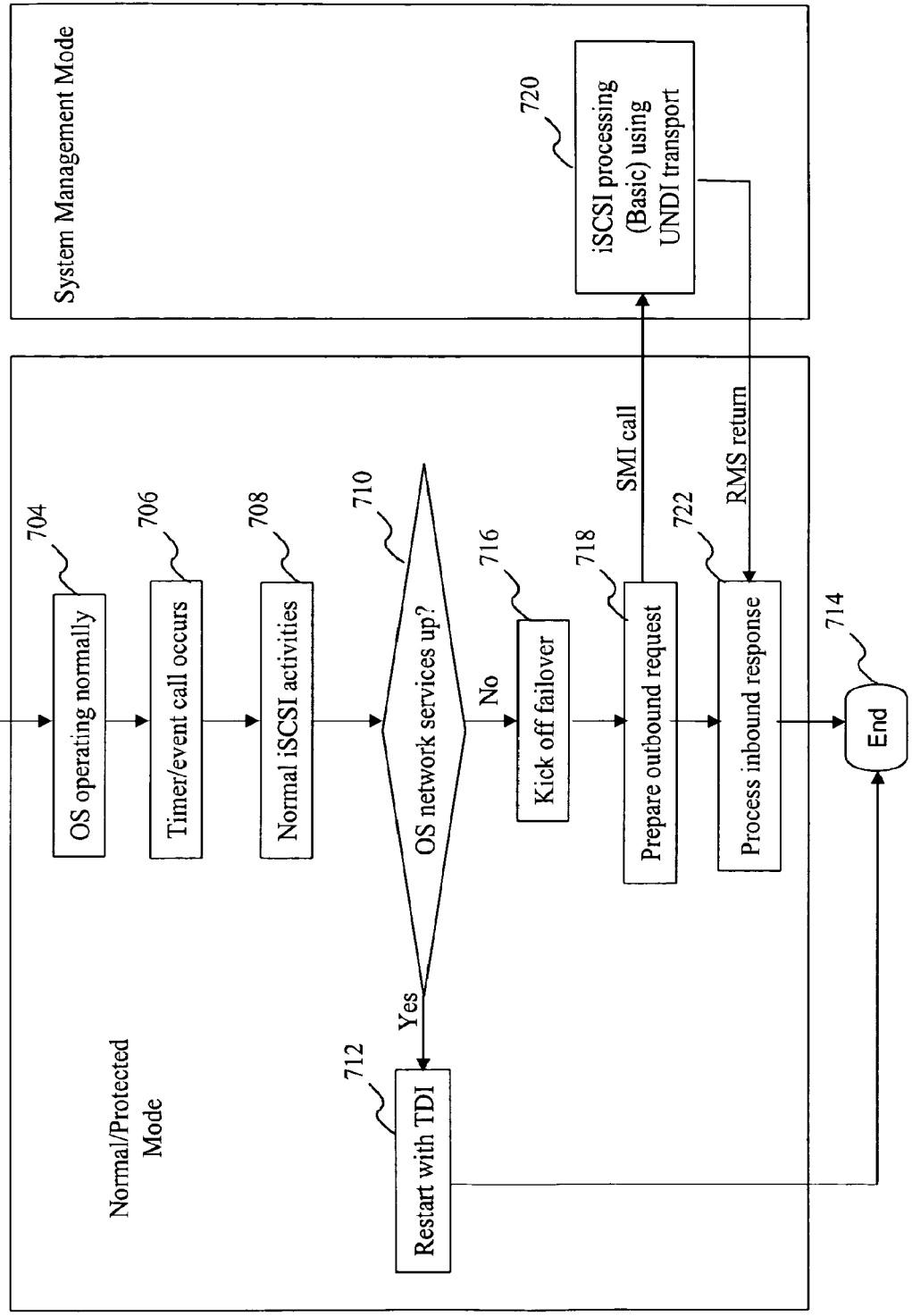
FIG. 7 is a flow-chart showing the iSCSI/BPM failover process in a steady state.

FIG. 7 shows the process when iSCSI BPM failover is in steady state. Steps 702 through 714 are similar to those described above as steps 602 through 614, and will not be re-described. Note that in normal mode, the iSCSI driver prepares outbound requests and processes inbound requests for data to be stored or retrieved from the hard drive array. When UNDI is called (kick off failover—block 716), outbound requests are prepared with an SMI call to SMM (block 720), which processes inbound responses with an RMS return (block 722).

Figure 8:
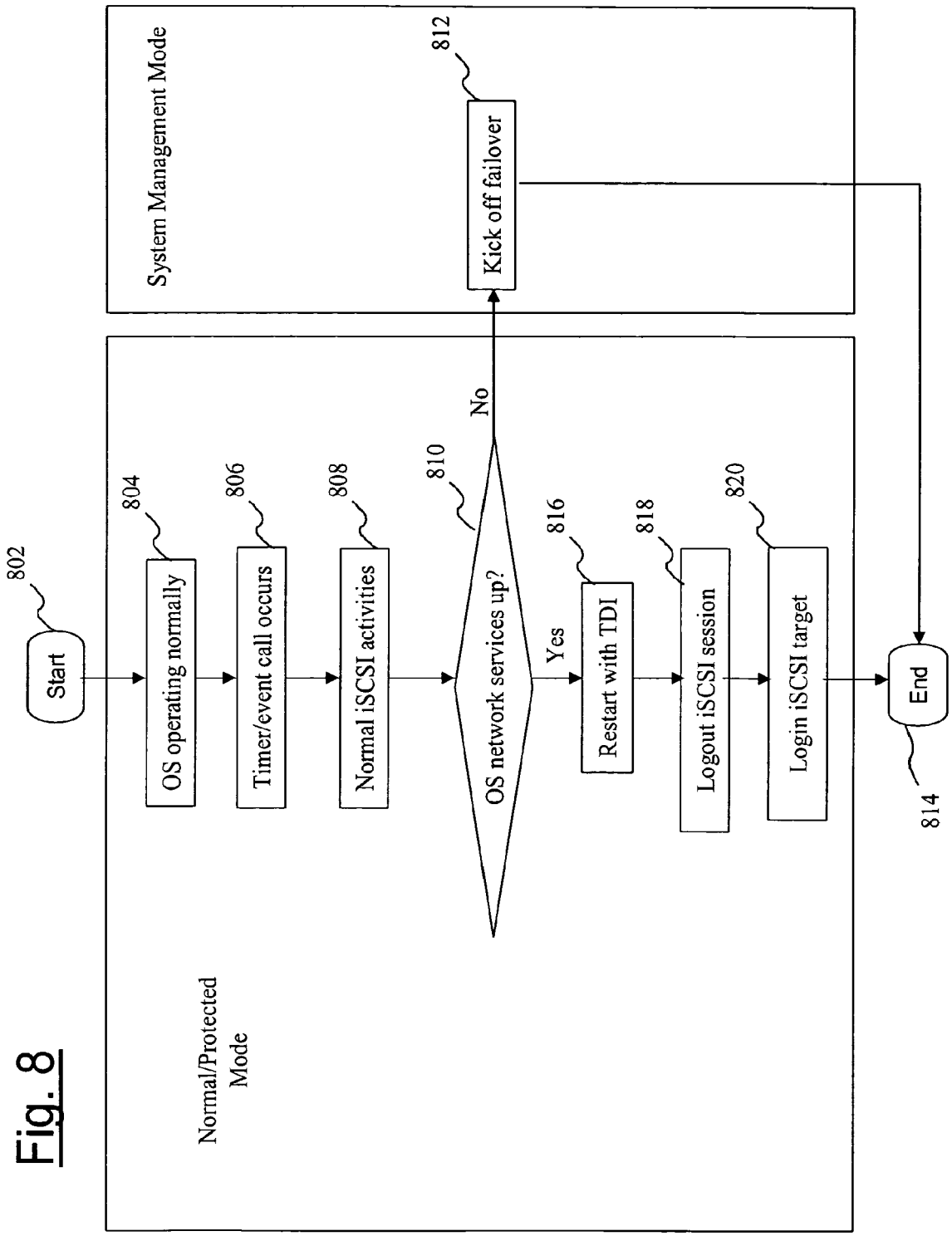
FIG. 8 is a flow-chart showing the iSCSI/BPM logging out process.

FIG. 8 shows the process when iSCSI BPM failover is logging out, thus taking steps to ensure a proper transition back to normal OS operations. Steps 802 through 810 are as described above for steps 602 through 610. If OS network services are not up, then failover is kicked off in SMM (block 812). Once the OS network services are back up, then the rich (full function) OS is restarted using TDI (block 816), the iSCSI session is logged out in normal mode (block 818), and normal software iSCSI target (120 in FIG. 2*c*) is logged into by the OS (block 820), thus ending the process (terminator block 814).

Note that from the OS network services' perspective, the present invention addresses the operation on a given blade. This results in resiliency in the absence of OS network services due to atypical behavior on the blade itself, and allows the blade to have redundant paths to handle OS anomalies. In normal operations, the blade uses the standard OS network services (TDI/NDIS network transport services in Windows®, newt0 network transport services in Linux®, and rich scope for all Logical Unit Numbers (LUNs) that uniquely identify SCSI busses to distinguish between devices that share the same SCSI bus). During anomaly conditions, the computer is able to use the described BIOS/UNDI network services during anomalies such as OS shutdowns, OS upgrades and OS crashes. For both Windows® and Linux® systems, BIOS/UNDI services are re-enabled. Because the Boot LUN is used, there is simple threading and simple memory management.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method comprising: emulating a Host Bus Adapter (HBA) in software to enable a communication of data packets between a computer and a secondary memory via a single Network Interface Card (NIC) controlled by a NIC driver; disabling the NIC driver in response to an anomaly in an Operating System (OS) in the computer; and in response to the NIC driver being disabled due to the anomaly in the OS in the computer, dynamically activating a Universal Network Device Interface (UNDI) driver, wherein the UNDI driver is activated by calling a Basic Input/Output System (BIOS) boot loader to activate the UNDI drive to re-enable the NIC driver to continue the communication via a network between the computer and the secondary memory without utilizing the NIC driver.

2. The method of claim 1, wherein the UNDI driver is activated by calling a Basic Input/Output System (BIOS) boot loader to activate the UNDI driver.

3. The method of claim 2, wherein the BIOS boot loader is called by a System Management Interrupt (SMI) signal from the emulated HBA that is stored within the computer.

4. The method of claim 1, wherein the secondary memory is a hard drive array.

5. The method of claim 4, wherein the network is an Internet.

6. The method of claim 1, wherein the anomaly in the OS is an initiation of a shut-down of the OS.

7. The method of claim 1, wherein the anomaly in the OS is a loading of an upgrade to the OS.

8. A computer-readable medium encoded with a computer program, the computer program comprising computer executable instructions configured for: emulating a Host Bus Adapter (HBA) in software to enable a communication of data packets between a computer and a secondary memory via a single Network Interface Card (NIC) controlled by a NIC driver; disabling the NIC driver in response to an anomaly in an Operating System (OS) in the computer; and in response to the NIC driver being disabled due to the anomaly in the OS in the computer, dynamically activating a Universal Network Device Interface (UNDI) driver, wherein the UNDI driver is activated by calling a Basic Input/Output System (BIOS) boot loader to activate the UNDI drive to re-enable the NIC driver to re-enable the NIC driver for to continue the communication via a network between the computer and the secondary memory without utilizing the NIC driver.

9. The computer-readable medium of claim 8, wherein the UNDI driver is activated by calling a Basic Input/Output System (BIOS) boot loader to activate the UNDI driver.

10. The computer-readable medium of claim 9, wherein the BIOS boot loader is called by a System Management Interrupt (SMI) signal from the emulated HBA that is stored within the computer.

11. The computer-readable medium of claim 8, wherein the secondary memory is a hard drive array.

12. The computer-readable medium of claim 11, wherein the network is an Internet.

13. The computer-readable medium of claim 8, wherein the anomaly in the OS is an initiation of a shut-down of the OS.

14. The computer-readable medium of claim 8, wherein the anomaly in the OS is a loading of an upgrade to the OS.

15. A system comprising: means for emulating a Host Bus Adapter (HBA) in software to enable a communication of data packets between a computer and a secondary memory via a single Network Interface Card (NIC) controlled by a NIC driver; means for disabling the NIC driver in response to an anomaly in an Operating System (OS) in the computer, wherein the OS remains operational in the computer during the anomaly; and means for, in response to the NIC driver being disabled due to the anomaly in the OS in the computer, dynamically activating a Universal Network Device Interface (UNDI) driver, wherein the UNDI driver is activated by calling a Basic Input/Output System (BIOS) boot loader to activate the UNDI drive to re-enable the NIC driver to re-enable the single NIC driver for to continue the communication via a network between the computer and the secondary memory without utilizing the NIC driver.

16. The system of claim 15, wherein the UNDI driver is activated by calling a Basic Input/Output System (BIOS) boot loader to activate the UNDI driver.

17. The system of claim 16, wherein the BIOS boot loader is called by a System Management Interrupt (SMI) signal from the emulated HBA that is stored within the computer.

18. The system of claim 15, wherein the secondary memory is a hard drive array.

19. The system of claim 18, wherein the network is an Internet.

20. The system of claim 15, wherein the anomaly in the OS is an initiation of a shut-down of the OS.

* * * * *